(12) United States Patent
Humer et al.

(10) Patent No.: US 7,188,894 B2
(45) Date of Patent: Mar. 13, 2007

(54) TRIGGER MECHANISM FOR IMPACT RESPONSE DEVICES IN A SEAT

(75) Inventors: Mladen Humer, Eastpointe, MI (US); Nagarjun Yetukuri, Rochester Hills, MI (US); Gerald S. Locke, Lake Orion, MI (US); Mark S. Sebby, Brighton, MI (US)

(73) Assignee: Lear Corporation, Southfield, MI (US)

( * ) Notice: Subject to any disclaimer, the term of this patent is extended or adjusted under 35 U.S.C. 154(b) by 281 days.

(21) Appl. No.: 10/710,684

(22) Filed: Jul. 28, 2004

(65) Prior Publication Data

US 2006/0022497 A1 Feb. 2, 2006

(51) Int. Cl.
*B60N 2/42* (2006.01)
*B60R 21/00* (2006.01)

(52) U.S. Cl. .............................. 297/216.13; 297/216.12

(58) Field of Classification Search ............. 297/216.1, 297/216.12, 216.13, 216.14
See application file for complete search history.

(56) References Cited

U.S. PATENT DOCUMENTS

| 5,938,279 | A | 8/1999 | Schubring |
| 6,273,511 | B1 * | 8/2001 | Wieclawski ............... 297/463.1 |
| 6,478,373 | B1 | 11/2002 | Hake |
| 6,568,754 | B1 | 5/2003 | Norton |
| 6,692,071 | B2 | 2/2004 | Fowler |
| 6,749,256 | B1 * | 6/2004 | Klier et al. ............ 297/216.12 |
| 6,779,840 | B1 * | 8/2004 | Farquhar et al. ....... 297/216.12 |
| 6,840,560 | B2 * | 1/2005 | Flogard ...................... 296/68.1 |
| 7,097,242 | B2 * | 8/2006 | Farquhar et al. ....... 297/216.12 |
| 2001/0040396 | A1 | 11/2001 | Kreuels |
| 2003/0057758 | A1 | 3/2003 | Baumann |
| 2003/0151279 | A1 | 8/2003 | Fowler |
| 2004/0061362 | A1 | 4/2004 | Farquhar |

FOREIGN PATENT DOCUMENTS

| FR | 2830219 A | 4/2003 |
| GB | 2395114 A | 11/2002 |
| JP | 2003267107 A | 9/2003 |

* cited by examiner

*Primary Examiner*—Peter M. Cuomo
*Assistant Examiner*—Sarah B. McPartlin
(74) *Attorney, Agent, or Firm*—Earl LaFontaine Esq; Artz & Artz, P.C.

(57) ABSTRACT

An automotive seat assembly is provided including a seatback and a motion translation element pivotably mounted within. The motion translation element includes a back engagement portion, movable between a back engagement stable position and a back intrusion position, and a translation portion, movable from a translation stable position to a translation actuated position in response to the back engagement portion movement. A intermediary element is rotatably attached to the translation portion, such that it is moved between an intermediary stable position and an intermediary actuated position. The intermediary element is additionally movable between a disengagement position and a engagement position. A momentum cam is utilized to move the intermediary element into the engagement position during vehicle impact. A trigger arm is positioned within said seatback and engages the intermediary element when in said engagement position. The trigger arm moves into a trigger deployed position in response to the back engagement portion entering the back intrusion position only when in the engagement position. A seatback impact response device is actuated by the trigger arm when it moves into the trigger deployed position.

20 Claims, 4 Drawing Sheets

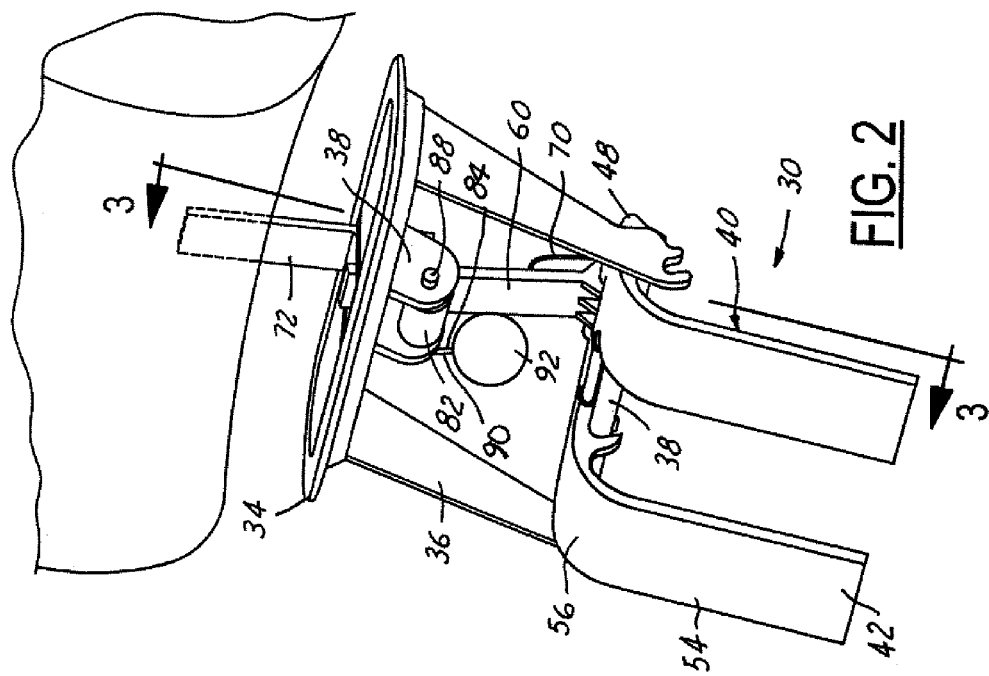
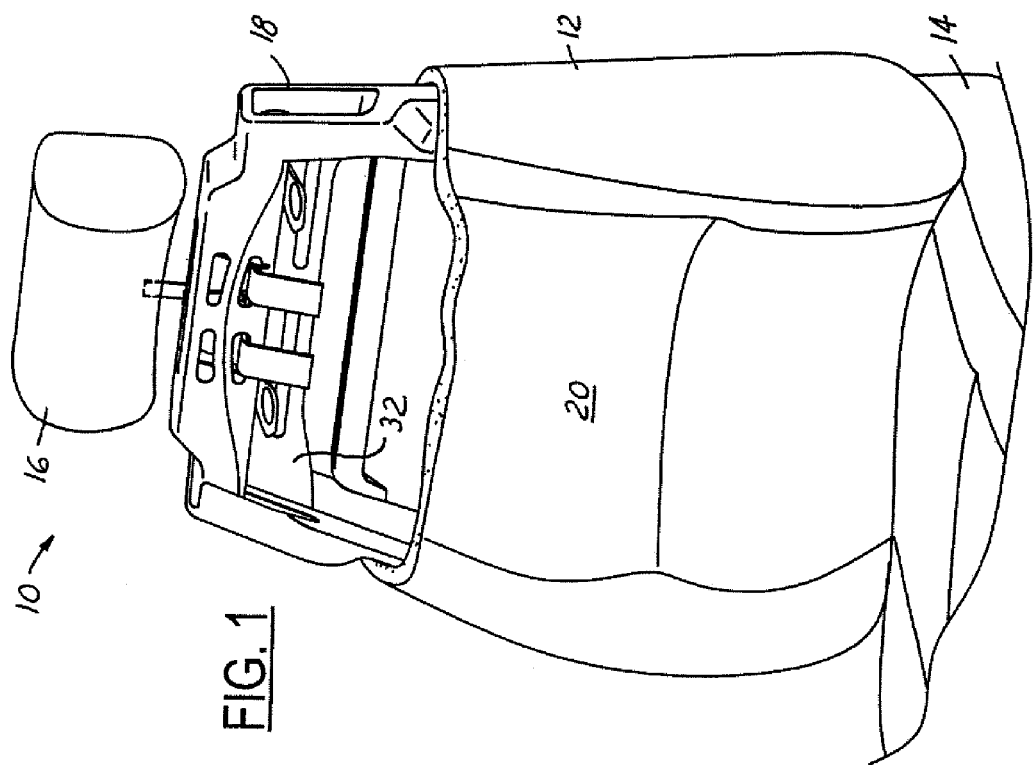

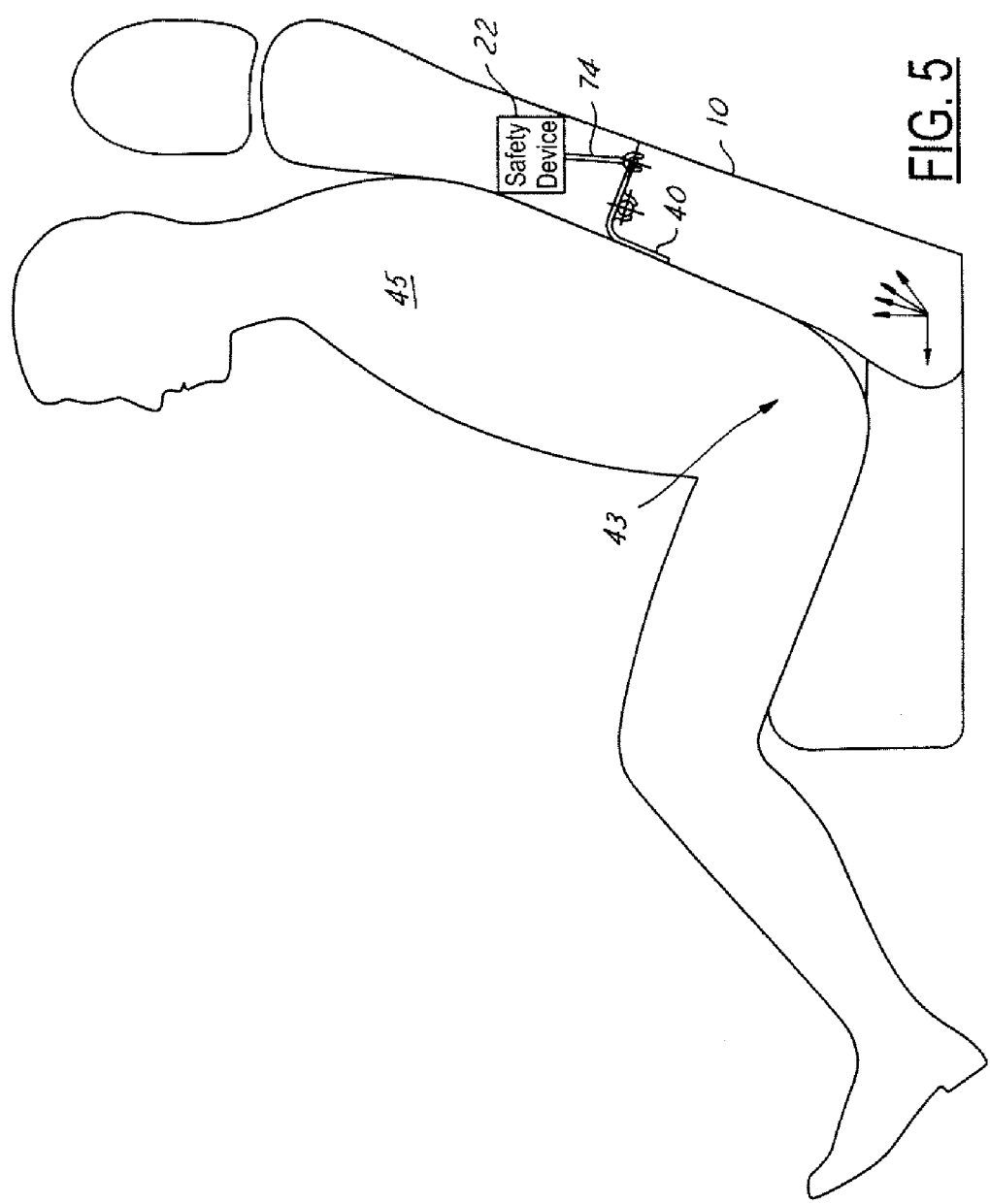

TRIGGER MECHANISM FOR IMPACT RESPONSE DEVICES IN A SEAT

BACKGROUND OF INVENTION

The present invention relates generally to an automotive seat assembly and more particularly to an automotive seat assembly with a trigger mechanism for actuating impact response devices within the seat.

Automotive design is guided by a never-ending goal of improving the safety and comfort of passengers traveling within the vehicles. As the nature of existing vehicular travel precludes the ability to completely eliminate incidents of collision during operation, automotive designers pursue design improvements to minimize the impact of such collisions on the internal passengers. These design improvements often are located in a wide variety of components within the automobile. They may include a variety of features and functions from intrusion reduction to momentum absorbance.

One such category involves the use of energy seat impact response devices. These devices are utilized to protect passengers during collision. One example are safety mechanisms designed to move the headrest forward in order to engage the passenger's head during rear-impact scenarios. By actively engaging the passenger's head, momentum from the passenger's head can be reduced and thereby further insure the comfort and safety of the passenger during collision. Although a single incidence of seat based safety mechanisms has been described, a variety of such devices such as air bags, intrusion protection, and momentum reduction devices are contemplated.

Although safety improvement is an underlying goal of all such design objectives, it is understood that these considerations are not viewed alone and in a vacuum. Additional design constrains such as weight, cost, and manufacturability must also be considered in any successful design. Safety features as described commonly perform active operations during impact. These active operations require a trigger mechanism in order to actuate the impact response devices at an appropriate moment. Electronic triggering devices are highly adaptable but often involve undesirable expenses in design and integration. In addition, many triggering devices require complex integration into other vehicle modules such as the airbag control units. This involves complex design, manufacturing, and assembly procedures. It also can require system wide design integration impeding the implementation of impact response devices into existing platforms.

What would be highly desirable is to have a mechanical trigger mechanism for integration into an automotive seat assembly that did not require expensive electronic triggering devices. It would further be highly desirable to have such a trigger mechanism that could operate without complex integration into multiple vehicle modules. Finally, it would be beneficial for such a trigger mechanism to have the capacity to activate a plurality of impact response devices within the seat.

SUMMARY OF INVENTION

It is, therefore, an object of the present invention to provide an automotive seat assembly with an integrated mechanical trigger mechanism. It is a further object of the present invention to provide such a trigger mechanism whose operation is not dependent on complex system wide integration into the vehicle.

An automotive seat assembly is provided including a seatback and a motion translation element pivotably mounted within. The motion translation element includes a back engagement portion, movable between a back engagement stable position and a back intrusion position, and a translation portion, movable from a translation stable position to a translation actuated position in response to the back engagement portion movement. A intermediary element is rotatably attached to the translation portion, such that it is moved between an intermediary stable position and an intermediary actuated position. The intermediary element is additionally movable between a disengagement position and a engagement position. A momentum cam is utilized to move the intermediary element into the engagement position during vehicle impact. A trigger arm is positioned within said seatback and engages the intermediary element when in said engagement position. The trigger arm moves into a trigger position in response to the back engagement portion entering the back intrusion position only when in the engagement position. A seatback impact response device is actuated by the trigger arm when it moves into the trigger position.

Other objects and features of the present invention will become apparent when viewed in light of the detailed description of the preferred embodiment when taken in conjunction with the attached drawings and appended claims.

BRIEF DESCRIPTION OF DRAWINGS

FIG. 1 is an illustration of an automotive seat assembly in accordance with the present invention.

FIG. 2 is a detailed illustration of the trigger mechanism for use in the automotive seat assembly illustrated in FIG. 1.

FIG. 5 is a cross-sectional illustration of the automotive seat assembly illustrated in FIG. 1, the trigger mechanism illustrated in a seat position optimizing pelvic seat intrusion.

DETAILED DESCRIPTION

Figure 3:
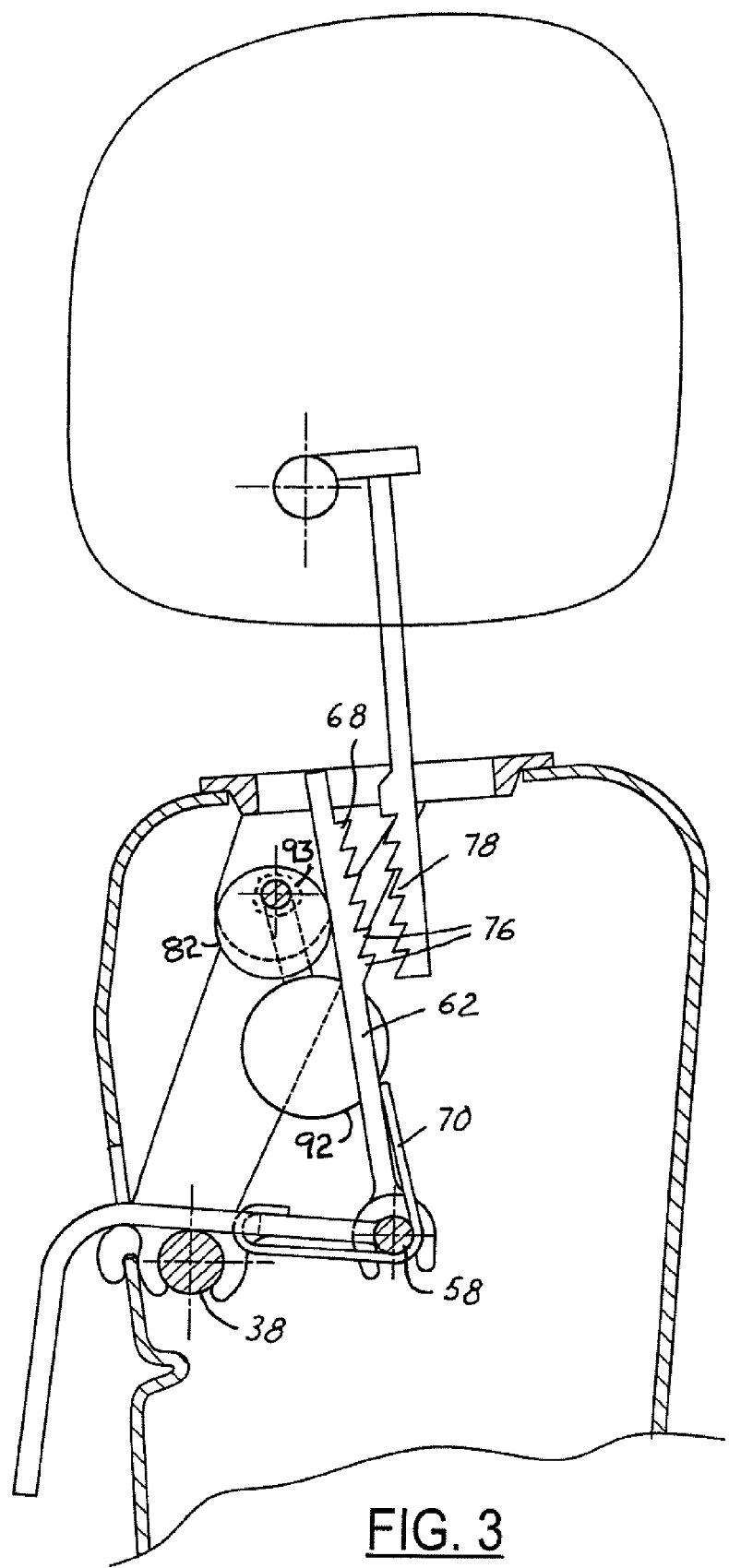
FIG. 3 is a cross-sectional illustration of the automotive seat assembly illustrated in FIG. 1, the trigger mechanism illustrated in the back engagement stable position.

Referring now to FIG. 1, which is an illustration of an automotive seat assembly 10 in accordance with the present invention. The automotive seat assembly 10 illustrated is intended to encompass a wide variety of seating configurations for both front and read automotive seats. The seat assembly 10 includes a seatback 12 and seatbase 14 as is well understood in the art. A headrest 16 element may also be used in conjection with the seatback 12 for further passenger comfort. Although a wide variety of configurations for the seatback 12 are contemplated, one embodiment contemplates the use of seatback frame 18 covered by an outer padding assembly 20.

Modern seat design requirements often require the integration of a seatback impact response device 22 (see FIG. 4) within the seat assembly 10. Although a variety of such devices are contemplated, the illustrated device takes the form a head restraint motion element 24. Such devices function by moving the headrest 16 from a headrest operational position 26 to a headrest forward engagement position 28. During rear impacts this is useful as it brings the headrest 16 forward to engage the passengers head which in turn reduces whiplash and related stressors on the passenger. It should be understood that a wide variety of seatback impact response devices 22, positioned throughout the seat assembly 10, are contemplated by the present invention. Another such impact response device 22 could include seatbelt retractors utilized to lock the spool in response to impact. In addition, the present invention contemplates the use of multiple seatback impact response devices 22.

The present invention provides a unique, novel, and inexpensive apparatus for triggering one or more of the seatback impact response devices 22. This is accomplished through the use of a trigger assembly 30 (or actuation assembly) mounted within the seatback 12. The trigger assembly 30 preferably includes a mounting frame 32 for direct mounting to the seatback frame 18 within the outer pad assembly 20. Although a variety of mounting frames 32 are contemplated, an upper mounting platform 34, dual mounting side extensions 36 and a pivot arm 38 mounted between these extensions 36 are contemplated. In this fashion the mounting frame 32 is tailored to fit within a standard designed seatback frame 18. A motion translation element 40 is rotatably mounted to the mounting frame 32, preferably by way of the pivot arm 38. The motion translation element 40 is designed to transform horizontal motion from a passenger's intrusion into the outer padding assembly 20 into vertical or other trigger motion. Therefore, the motion translation element 40 includes a back engagement portion 42 movable between a back engagement stable position 44 and a back intrusion position 46 (see FIG. 4). As the weight of a passenger intrudes into the outer padding assembly 20, the back engagement position 42 is moved into the back intrusion position 46. It should be understood that the actuation assembly 30 may be positioned in any of a variety of positions along the seatback 10. By moving the actuation assembly 30 closer to the pelvic region 43 of the passenger 45, earlier intrusion can be detected (see FIG. 5) since commonly pelvic intrusion occurs first. This provides a unique benefit of having an actuation assembly 10 that may be positioned such that response timing may be tailored to intrusion position.

The motion translation element 40 further includes a translation portion 48 movable between a translation stable position 50 and a translation actuated position 52 in direct response to the back engagement portion 42 being moved into the back intrusion position 46. Although this may be accomplished in a variety of fashions, using an I-shaped element 54 (see FIG. 2) as the basis for the motion translation element 40 with the pivot arm 38 rotatably engaged in proximity to the I-bend 56 provides a simple mechanical mechanism for such motion translation. A rearward tubular arm 58 may be mounted at the translation portion 48. A intermediary element 60 is rotatably engaged to the translation portion 48, preferably by way of the rearward tubular arm 58, such that as the translation portion 48 is moved into the actuated position 52 the intermediary element 60 is moved from an intermediary stable position 62 (see FIG. 3) to an intermediary actuated position 64 (see FIG. 4). Since the intermediary element 60 rotatably engages the translation portion 48, it is further able to move horizontally between an engagement position 66 (see FIG. 4) and a disengagement position 68 (see FIG. 3). The intermediary element 60 is preferably biased to remain in the disengagement position 68 such that passenger intrusion resulting from non-momentum based collisions, such as jumping into the seat 10, may move the intermediary element 60 into the intermediary actuated position 64 but will fail to move it into the engagement position 66. A intermediary biasing spring 70 may be used to bias the intermediary element 60 forward into the disengagement position 68.

Figure 4:
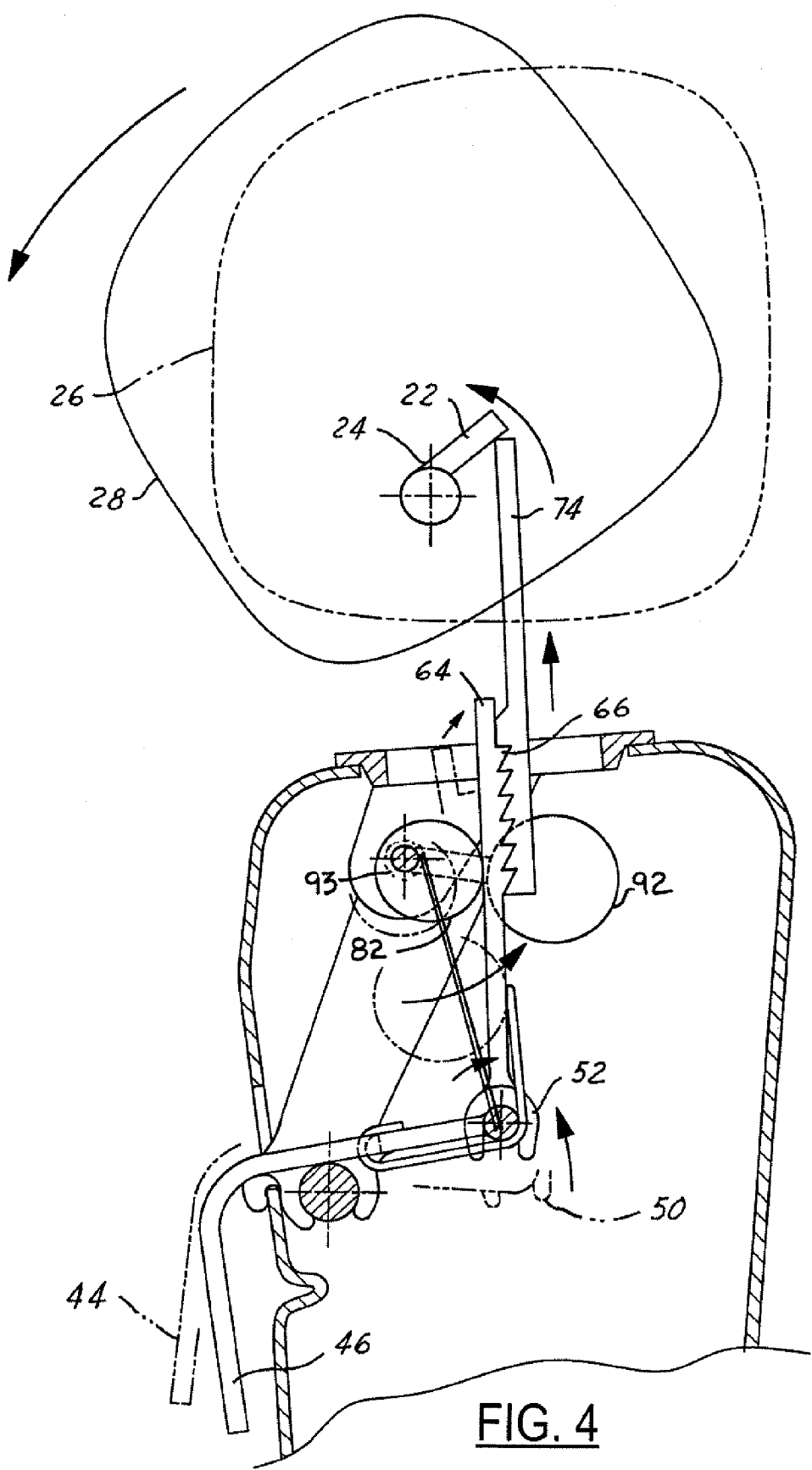
FIG. 4 is a cross-sectional illustration of the automotive seat assembly illustrated in FIG. 1, the trigger mechanism illustrated in the back intrusion position.

The present invention further contemplates the use of a trigger arm 72 positioned adjacent the intermediary element 60. The intermediary element 60 may move between the intermediary stable position 62 and the intermediary actuated position 64 without effecting the trigger arm 72 as long as it is in the disengagement position. When in the engagement position 66, however, as the intermediary element 60 moves into the intermediary actuated position 64 it engages the trigger arm 72 and moves it into the trigger deployed position 74. This allows it to engage and actuate the seat back impact response device 22 or devices. It is contemplated that the trigger arm 72 may be completely contained within the seatback 12 or may protrude out of the seatback 12 and into a neighboring component such as the headrest 16. This provides even greater design flexibility. The intermediary element 60 and the trigger arm 72 may engage in a variety of fashions. One embodiment contemplates the use of a plurality of intermediary engagement teeth 76 formed in the intermediary element 60 and a plurality of trigger arm engagement teeth 78 formed in the trigger arm 72. The teeth 76, 78 are preferably uni-directional engagement teeth as illustrated in FIGS. 3 and 4 wherein they only engage in a single direction. In the illustration at hand, the teeth 76, 78 engage during upward motion but would slide past one another during downward motion. Thus the present invention naturally resets itself after operation.

The present invention further includes a component to selectively control movement of the intermediary element 60 between the disengagement position 68 and the engagement position 66. This component is the momentum cam assembly 80. The momentum cam assembly 80 is utilized such that it moves the intermediary element 60 into the engagement position 66 only as a result of vehicular impact. Thus, unless sufficient change in vehicular momentum, such as through rear impact, is imparted the momentum cam assembly 80 will not move the intermediary element 60. Although a variety of configurations are contemplated, one embodiment contemplates the use of a rotatable cam element 82 mounted to a cam arm 84 rotatably mounted to the mounting frame 32 by way of a cam mounting bracket 86. The cam arm 84 can include a horizontal arm portion 88 for engaging the cam mounting bracket 86 and a vertical arm portion 90 from which a biasing weight 92 is hung/mounted. The horizontal arm portion 88 preferably engages the rotatable cam element 82 by way of a liquid damping element 93. In this way, the seatback 12 may be positioned in a variety of angles 95 (see FIG. 5) suitable to passenger comfort while still keeping orientation of the cam element 82 relative to the intermediary element 60. This is significant since this means the seatback 10 can be positioned in any of the plurality of angles 95 without altering the sensitivity of actuation of the actuation assembly 30. Consistency of actuation will allow automotive designers improved reliability for integration into a variety of impact response devices. During a rear collision the biasing weight 92 will resist motion in a Newtonian fashion and thereby rotate the cam element 82, as the quick acceleration will prevent rotation of the horizontal arm portion 88 within the cam element 82 (due to velocity in the liquid damper 93). This in turn moves the intermediary element 60 into the engagement position 66. Subsequent passenger intrusion into the outer padding assembly 20 as a result of the rearward impact will move the motion translation element 40 into the back intrusion position 46, the intermediary element 60 into the intermediary actuated position 52, and finally the trigger arm 72 into the trigger deployed position 74. The motion translation element 40 can additionally be placed in direct communication with the liquid damper 93 such that velocity of motion of the motion translation element 40 contributes to controlling the cam element 82 (see FIG. 4). This provides a further range of control. The present invention therefore provides a simple yet reliable mechanical assembly for operating one or more seatback impact response devices 22.

While particular embodiments of the invention have been shown and described, numerous variations and alternative embodiments will occur to those skilled in the art. Accordingly, it is intended that the invention be limited only in terms of the appended claims.

The invention claimed is:

1. An automotive actuation assembly for use in an automotive seat assembly having a seatback positionable in a plurality of seatback angles, said automotive actuation assembly comprising:
   a motion translation element pivotably mounted within said seatback, said motion translation element including a back engagement portion and a translation portion, said back engagement portion movable between a back engagement stable position and a back intrusion position, said translation portion movable from a translation stable position to a translation actuated position, said motion translation element pivoting to move said translation portion into said translation actuated position in response to said back engagement portion moving into said back intrusion position;
   a intermediary element rotatably attached to said translation portion, said intermediary element movable between an intermediary stable position and an intermediary actuated position, said intermediary element additionally movable between a disengagement position and a engagement position, said intermediary element biased towards said disengagement position;
   a momentum cam assembly in communication with said intermediary element, said momentum cam assembly moving said intermediary element into said engagement position during vehicle impact, said momentum cam assembly including a biasing weight in communication with a liquid damper element, said liquid damper allowing said momentum cam assembly to adapt to the plurality of seatback angles;
   a trigger arm positioned within said seatback, said trigger arm engaging said intermediary element when said intermediary element is in said engagement position, said trigger arm moving into a trigger deployed position in response to said back engagement portion entering said back intrusion position only when said intermediary element is in said engagement position; and
   a seatback impact response device, said trigger arm actuating said seatback impact response device when said trigger arm moves into said trigger deployed position.

2. An automotive actuation assembly as described in claim 1, the seatback including a seatback frame, said actuation assembly further comprising:
   a mounting frame mounted within the seatback frame, said mounting frame positionable in a plurality of vertical locations within the seatback frame, said mounting frame including a pivot arm; and
   wherein said motion translation element comprises an I-shaped element rotatably engaging said pivot arm, said pivot arm engaging said motion translation element in a position between said back engagement portion and said translation portion.

3. An automotive actuation assembly as described in claim 1, wherein said motion translation element is in communication with said liquid damper such that velocity of said motion translation element moves said momentum cam assembly.

4. An automotive actuation assembly as described in claim 1, wherein said momentum cam assembly comprises:
   a rotatable cam element;
   a cam arm comprising:
   a horizontal arm portion mounted to said rotatable cam element; and
   a vertical arm portion extending downwards from said horizontal arm portion;
   a liquid damper positioned between said cam arm and said rotatable cam element such that said liquid damper allows said momentum cam assembly to adapt to the plurality of seatback angles; and
   a biasing weight mounted to said vertical arm portion.

5. An automotive actuation assembly as described in claim 4, further comprising:
   a mounting frame including cam mounting bracket, said horizontal arm portion rotatably mounted to said cam mounting bracket.

6. An automotive actuation assembly as described in claim 1, wherein said seatback impact response device comprises a head restraint motion element.

7. An automotive actuation assembly as described in claim 1, further comprising:
   a rearward tubular arm mounted on mounting frame positioned within the seatback, said intermediary element rotatably engaged to said rearward tubular arm.

8. An automotive actuation assembly as described in claim 6, further comprising:
   a plurality of intermediary engagement teeth formed on said intermediary element; and
   a plurality of trigger arm engagement teeth formed on said trigger arm, said intermediary engagement teeth engaging said trigger arm engagement teeth when said intermediary element is in said engagement position.

9. An automotive actuation assembly as described in claim 8, wherein said intermediary engagement teeth and said trigger arm engagement teeth comprises uni-directional engagement teeth.

10. An automotive actuation assembly as described in claim 8, wherein said intermediary element can engage said trigger arm in a variety of positions.

11. An automotive actuation assembly as described in claim 1 for use in an automobile wherein said trigger arm protrudes upwards outside of said seatback.

12. An automotive actuation assembly as described in claim 11, wherein said trigger arm protrudes out of the seatback and into a headrest assembly mounted to the seatback.

13. An automotive seat assembly for use in an automobile comprising:
   a seatback;
   a motion translation element pivotably mounted within said seatback, said motion translation element including a back engagement portion and a translation portion, said back engagement portion movable between a back engagement stable position and a back intrusion position, said translation portion movable from a translation stable position to a actuated position, said motion translation element translating said translation portion into said actuated position in response to said back engagement portion moving into said back intrusion position;

a intermediary element rotatably attached to said translation portion, said intermediary element movable between an intermediary stable position and an intermediary actuated position, said intermediary element additionally movable between a disengagement position and a engagement position, said intermediary element biased towards said disengagement position;

a momentum cam assembly in communication with said intermediary element, said momentum cam assembly moving said intermediary element into said engagement position during vehicle impact;

a trigger arm positioned within said seatback, said trigger arm engaging said intermediary element when said intermediary element is in said engagement position, said trigger arm moving into a trigger position in response to said back engagement portion entering said back intrusion position only when said intermediary element is in said engagement position; and a seatback impact response device, said trigger arm actuating said seatback impact response device when said trigger arm moves into said trigger position.

14. An automotive seat assembly as described in claim 13 further comprising:

a seatback frame positioned within said seatback;

a mounting frame mounted to said seatback frame, said mounting frame including a pivot arm; and wherein said motion translation element comprises an I-shaped element rotatably engaging said pivot arm, said pivot arm engaging said motion translation element in a position between said back engagement portion and said translation portion.

15. An automotive seat assembly as described in claim 13, wherein said momentum cam assembly comprises:

a rotatable cam element;

a cam arm comprising:

a horizontal arm portion in communication with said rotatable cam element; and a vertical arm portion extending downwards from said horizontal arm portion;

a liquid damper element positioned between said horizontal arm portion and said rotatable cam element; and a biasing weight mounted to said vertical arm portion.

16. An automotive seat assembly as described in claim 13, wherein said seatback impact response device comprises a head restraint motion element.

17. An automotive seat assembly as described in claim 13, wherein said trigger arm protrudes out of said seatback and into a headrest assembly mounted to said seatback.

18. A method of triggering an automotive seat impact response device comprising:

rotating a motion translation element positioned within a seatback from a back engagement stable position to a back intrusion position in response to passenger intrusion into said seatback;

moving a intermediary element from an intermediary stable position to an intermediary actuated position in response to said motion translation element moving into said back intrusion position;

moving said intermediary element from a disengagement position to an engagement position only during vehicular impact using a momentum cam assembly in communication with the intermediary element;

engaging a trigger arm with said intermediary element only when in said engagement position, said trigger arm moving into a trigger deployed position in response to said intermediary element moving into said intermediary actuated position;

actuating a seatback impact response device in response to said trigger arm moving into said trigger deployed position.

19. A method as described in claim 18, further comprising:

biasing said intermediary element into said disengagement position;

moving a biasing weight suspended from a cam arm in response to vehicular impact;

rotating a cam element in friction contact with said cam arm in response to the movement of said biasing weight;

using said cam element to move said intermediary element from said disengagement position to said engagement position.

20. A method as described in claim 18, further comprising:

engaging said trigger arm with said intermediary element using a plurality of uni-directional engagement teeth.

* * * * *